United States Patent
Hayashi

(10) Patent No.: US 9,031,386 B2
(45) Date of Patent: *May 12, 2015

(54) RECORDING SYSTEM, RECEIVING APPARATUS, RECORDING APPARATUS, RECORDING CONTROL METHOD, AND PROGRAM

(75) Inventor: Morihiko Hayashi, Kanagawa (JP)

(73) Assignee: Sony Corporation (JP)

( * ) Notice: Subject to any disclaimer, the term of this patent is extended or adjusted under 35 U.S.C. 154(b) by 319 days.

This patent is subject to a terminal disclaimer.

(21) Appl. No.: 13/483,408

(22) Filed: May 30, 2012

(65) Prior Publication Data

US 2012/0237187 A1    Sep. 20, 2012

Related U.S. Application Data

(63) Continuation of application No. 12/462,226, filed on Jul. 31, 2009, now Pat. No. 8,201,209.

(30) Foreign Application Priority Data

Aug. 4, 2008   (JP) ................................ P2008-201180

(51) Int. Cl.
```
H04N 5/76      (2006.01)
H04N 5/775     (2006.01)
H04N 5/781     (2006.01)
H04N 5/85      (2006.01)
```
(52) U.S. Cl.
CPC .............. *H04N 5/775* (2013.01); *H04N 5/781* (2013.01); *H04N 5/85* (2013.01)

(58) Field of Classification Search
CPC ....... H04N 5/782; H04N 5/781; H04N 5/775; H04N 5/85; H04N 5/765; H04N 5/76; H04N 21/47214; H04N 21/4334; H04N 21/4135; H04N 21/43622; H04N 21/43615; H04N 21/4147; H04H 60/27; G11B 20/10
USPC .................................................. 386/291–299
See application file for complete search history.

(56) References Cited

U.S. PATENT DOCUMENTS

| | | | |
|---|---|---|---|
| 6,219,839 B1 | 4/2001 | Sampsell | |
| 8,201,209 B2 * | 6/2012 | Hayashi | ........................ 725/131 |
| 2003/0237085 A1 | 12/2003 | Boston et al. | |
| 2008/0013919 A1 | 1/2008 | Boston et al. | |

FOREIGN PATENT DOCUMENTS

| | | |
|---|---|---|
| JP | 2003348509 A | 12/2003 |
| JP | 2004-328648 A | 11/2004 |
| JP | 2005222643 A | 8/2005 |
| WO | 2008035653 A1 | 3/2008 |

OTHER PUBLICATIONS

Office Action from Japanese Application No. 2008-201180, dated May 11, 2010.

* cited by examiner

*Primary Examiner* — Thai Tran
*Assistant Examiner* — Stephen Smith
(74) *Attorney, Agent, or Firm* — Lerner, David, Littenberg, Krumholz & Mentlik, LLP

(57) ABSTRACT

A recording system includes a receiving apparatus and a recording apparatus. The receiving apparatus includes a creation section and a reservation control section. The recording apparatus includes a recording section and a recording control section.

11 Claims, 6 Drawing Sheets

RECORDING SYSTEM, RECEIVING APPARATUS, RECORDING APPARATUS, RECORDING CONTROL METHOD, AND PROGRAM

CROSS-REFERENCE TO RELATED APPLICATION

The present application is a continuation of U.S. patent application Ser. No. 12/462,226, filed on Jul. 31, 2009, which claims priority from Japanese Application No. JP 2008-201180 filed in the Japanese Patent Office on Aug. 4, 2008, the disclosures of which are incorporated herein by reference.

BACKGROUND OF THE INVENTION

1. Field of the Invention

The present invention relates to a recording system, a receiving apparatus, a recording apparatus, a recording control method, and a program whereby the content data received by a source receiving apparatus is transmitted to a designation recording apparatus arranged to record the transmitted content data.

2. Description of the Related Art

Recent years have seen AV (audio visual) content streaming services offered by use of networks such as the Internet and cable TV (television) networks. Generally, these services involve distribution of receivers called set-top boxes (STB).

An STB not incorporating a hard disk drive (HDD) or the like capable of recording and saving contents may need to be connected in some way to a recorder for recording the contents. For example, if the STB and the recorder are connected to each other on a home network using the Ethernet (registered trademark) or the like, the STB may transfer contents to the recorder arranged to record the transferred contents (e.g., see Japanese Patent Laid-open No. 2004-328648).

SUMMARY OF THE INVENTION

However, where recording reservations are set using the above-mentioned home network, the recorder is not cognizant of any reservation on which is based the content transferred from the STB. If some content not based on any reservation is transferred to the recorder for recording, the recorder may thereafter become incapable of recording any other content of which the recording has been set beforehand.

The present invention has been made in view of the above circumstances and provides a recording system, a receiving apparatus, a recording apparatus, a recording control method, and a program for unfailingly recording the content that has been reserved for recording.

In carrying out the present invention and according to one embodiment thereof, there is provided a recording system including a receiving apparatus and a recording apparatus; wherein the receiving apparatus includes: a creation section configured to create reservation information designating a reception date and time at which to receive content data and a destination to which to transfer the received content data, together with identification information identifying the reservation information; and a reservation control section configured to transmit the reservation information and the identification information to the destination; the recording apparatus includes: a recording section configured to record the reservation information and the identification information; and a recording control section configured to control recording of the content data based on the reservation information; upon arrival of the reception date and time designated by the reservation information, the reservation control section receives the content data and transfers the received content data, along with the identification information, to the destination designated by the reservation information; and, given the identification information transferred along with the content data, the recording control section reads the reservation information from the recording section so as to record the content data based on the reservation information.

According to another embodiment of the present invention, there is provided a receiving apparatus including: a creation section configured to create reservation information designating a reception date and time at which to receive content data and a destination to which to transfer the received content data, together with identification information identifying the reservation information; and a reservation control section configured to transmit the reservation information and the identification information to the destination; wherein, upon arrival of the reception date and time designated by the reservation information, the reservation control section receives the content data and transfers the received content data, along with the identification information, to the destination designated by the reservation information.

According to a further embodiment of the present invention, there is provided a recording apparatus including: a recording section configured to record reservation information designating a reception date and time at which to receive content data and a destination to which to transfer the received content data, and identification information identifying the reservation information; and a recording control section configured to control recording of the content data based on the reservation information; wherein, given the identification information transferred along with the content data, the recording control section reads the reservation information from the recording section so as to record the content data based on the reservation information.

According to an even further embodiment of the present invention, there is provided a recording control method including the steps of: allowing a receiving apparatus to create reservation information designating a reception date and time at which to receive content data and a destination to which to transfer the received content data, together with identification information identifying the reservation information; allowing the receiving apparatus to transfer the reservation information and the identification information to the destination; allowing the destination to hold the reservation information and the identification information in a recording section; upon arrival of the reception date and time designated by the reservation information, allowing the receiving apparatus to receive the content data and to transfer the received content data, along with the identification information, to the destination designated by the reservation information; and given the identification information transferred along with the content data, allowing the destination to read the reservation information from the recording section so as to record the content data based on the reservation information.

According to a still further embodiment of the present invention, there is provided a program for causing an information processing apparatus to execute a procedure including the steps of: allowing a receiving apparatus to create reservation information designating a reception date and time at which to receive content data and a destination to which to transfer the received content data, together with identification information identifying the reservation information; allowing the receiving apparatus to transfer the reservation information and the identification information to the destination; allowing the destination to hold the reservation information and the identification information in a recording section; upon arrival of the reception date and time designated by the reservation information, allowing the receiving apparatus to receive the content data and to transfer the received content data, along with the identification information, to the destination designated by the reservation information; and given the identification information transferred along with the content data, allowing the destination to read the reservation information from the recording section so as to record the content data based on the reservation information.

According to the present invention, the reservation information designating the reception date and time at which to receive content data and the identification information identifying the reservation information are held by both the source apparatus that transmits the content data and the destination apparatus that receives the transmitted content data. Upon arrival of the content data reception date and time designated by the reservation information, the source apparatus transmits the content data along with the identification information to the destination apparatus. This makes it possible reliably to record the content of which a recording reservation has been set.

BRIEF DESCRIPTION OF THE DRAWINGS

Further advantages of embodiments of the present invention will become apparent upon a reading of the following description and appended drawings in which.

DETAILED DESCRIPTION OF THE PREFERRED EMBODIMENTS

Some preferred embodiments of the present invention will now be described below in detail by referring to the accompanying drawings. A recording system embodying the present invention is configured so that a source receiving apparatus of the system transfers content data to a destination recording apparatus of the system arranged to record the content data.

Figure 1:
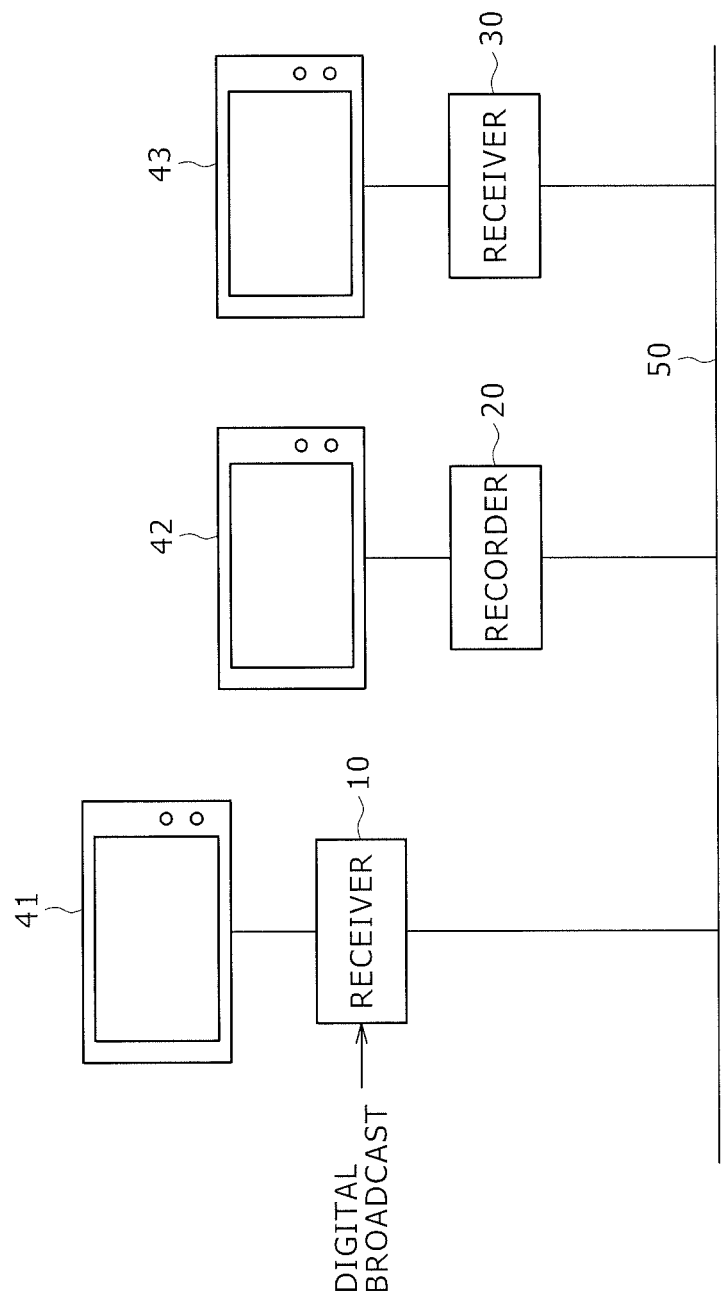
FIG. 1 is a view showing a typical configuration of a recording system as one embodiment of the present invention.

FIG. 1 shows a typical configuration of the recording system as one embodiment of the present invention. This recording system is made up of a receiver 10, a recorder 20, and a receiver 30 all interconnected by a network 50.

The receiver 10 receives digital broadcasts and may transfer content data of the received digital broadcast to the recorder 20 via the network 50. The recorder 20 is capable of recording the content data to a plurality of destination recording medium such as HDD (hard disk drive), DVD (digital versatile disc), and Blue-ray Disc (referred to as BD hereunder; registered trademark). Illustratively, the receiver 30 may receive a content delivered over the Internet and transfer the content data to the recorder 20 via the network 50.

The content received by the receiver 10 or 30 may be transferred via the network to the recorder 20 and recorded by the latter to the HDD or to the optical disk such as DVD inside. The content recorded by the recorder 20 may be reproduced by monitors 41 through 43 connected to the receiver 10, recorder 20, and receiver 30 respectively.

Through the use of their reservation recording function, the receivers 10 and 30 and the recorder 20 set recording reservations by communicating with one another. Based on the recording reservations, the receivers 10 and 30 transfer contents to the recorder 20 for recording. When making a recording reservation, the receiver 10 or 30 creates an individual reservation ID identifying reservation information designating the reception date and time at which to receive a content and the destination to which to transfer the received content. The receivers 10 and 30 and the recorder 20 record the reservation information and the reservation ID one another. Also, when making the recording reservation, the receiver 10 or 30 designates one of a plurality of recording medium incorporated in the recorder 20. For example, where the optical disk is desired, a type of medium such as DVD or BD is designated. The receivers 10 and and the recorder 20 record recording destination information along with the above-mentioned reservation ID. That is, the reservation information includes content information describing the genre, title, channel, date and time, etc., regarding the target content to be recorded, and the recording destination information describing the recorder as the destination for recording, the type of medium at the destination, etc.

When effecting a transfer to the recorder 20 based on the recording reservation, the recorder 10 or 30 notifies the recorder 20 of the reservation ID. This allows the recorder 20 to recognize the recording reservation on which the content transfer is based. The reservation ID also enables the recorder 20 to recognize the type of medium to which to record the content. This makes it possible to select the type of medium for each recording reservation.

Alternatively, when effecting the transfer based on the recording reservation, the receiver 10 or 30 may notify the recorder 20 of the type of medium such as DVD or BD along with the reservation ID.

Figure 2:
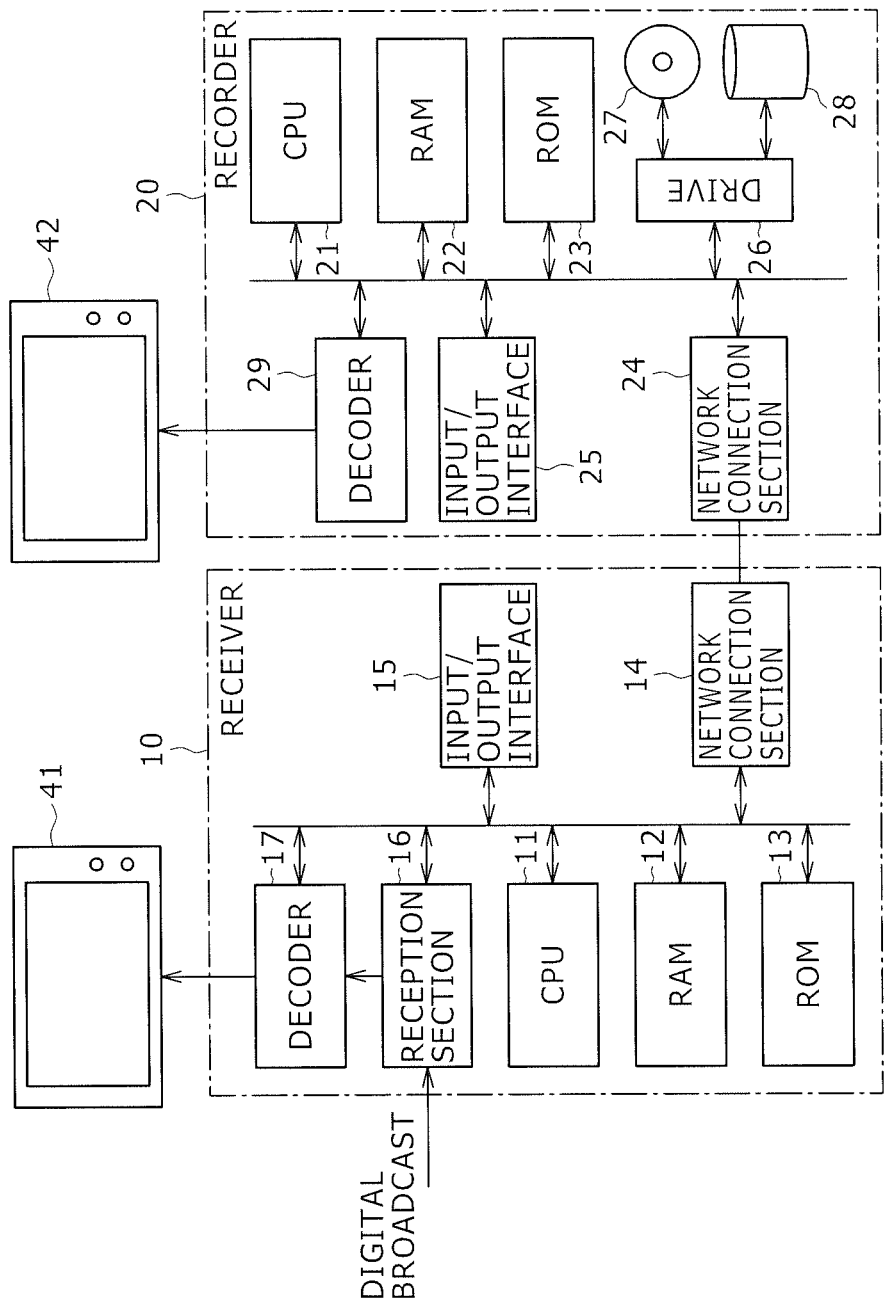
FIG. 2 is a block diagram showing structures of a receiver and a recorder making up the recording system.

FIG. 2 is a block diagram showing structures of the receiver and recorder making up the above-mentioned recording system. As an example, the receiver 10 receiving digital broadcasts and the recorder 20 possessing a plurality of recording medium as the destination for recording will be explained hereunder.

The receiver 10 contains a CPU (central processing unit) 11, a RAM (random access memory) 12, a ROM (read only memory) 13, a network connection section 14, an input/output interface 15, a reception section 16, and a decoder 17.

The CPU 11 is a main controller that controls the receiver 10 as a whole. Illustratively, the CPU 11 processes control information and program information which are transferred over a bus for channel selection purposes. More specifically, based on a digital copy control descriptor, a content usage descriptor, etc., describing information about the copyright protection of digital broadcast contents, the CPU 11 controls the real-time output and reproduction output of the received broadcast content and the processing of recording reservations for the purpose of content copyright protection. Also, when a recording reservation is to be made, the CPU 11 creates reservation information together with a reservation ID as will be discussed later, and transmits the created information and ID to the recorder 20 through the network connection section 14.

The RAM 12 is a rewritable volatile memory into which to load the executive program code of the CPU 11 or to which to write working data of executive programs.

The ROM 13 is a read-only memory that permanently stores self-diagnosis and/or initialization programs to be executed upon power-on of the receiver 10 as well as the microcode for hardware operations.

The network connection section 14 is a communication controller that communicates via the network with devices external to the receiver 10.

The input/output interface 15 is a module that processes the input operations performed by a user. Illustratively, the input/output interface 15 is furnished with control buttons/switches to be operated manually by the user, as well as a capability that accepts remote operations from a remote controller in the form of infrared rays (IR).

The receiver 16 contains a tuner and a demodulator. Given commands from the CPU 11, the tuner tunes in to the broadcast wave of a given channel and outputs the received data to the demodulator. In turn, the demodulator demodulates the received data that was digitally modulated.

The demodulated digital data illustratively constitutes a transport stream formed by MPEG-2 compressed AV data and program information being multiplexed. The AV data is made up of video and audio information as well as subtitle data making up the bodies of broadcast programs. The program information is a set of data that accompanies the broadcast programs. As such, the program information is described in section form such as PSI or SI and is used for bringing about EPG (electronic program guide) or for making program recording reservations.

The decoder 17 contains a TS decoder for interpreting the transport stream and an AV decoder for separating AV data into compressed video data and compressed audio data. The TS decoder interprets the transport stream and separates it into MPEG-2 compressed AV data and program information, outputting the compressed AV data to the AV decoder and transmitting the program information to the CPU 11 over the bus. The TS decoder may optionally be equipped with a local memory for holding working data. Upon receipt of the MPEG 2 compressed real-time AV data from the TS decoder, the AV decoder separates the received data into compressed video data and compressed audio data. The AV decoder then decompresses the video data in MPEG-2 format for reproduction of the original video signal and decodes the audio data in PCM (pulse code modulation) format before synthesizing the decoded data with additional sounds to create a reproduced audio signal. The AV decoder may optionally be furnished with a local memory for holding working data. The reproduced video signal is output to and displayed by the monitor 41 while the reproduced audio signal is output to and reproduced by speakers. On the basis of recording reservations, the compressed video data and compressed audio data may be transferred compressed to the recorder 20 through the network connection section 14 over the bus, as will be discussed later.

The receiver 10 is furnished with a HDD which, when a recording reservation is to be set, records the created reservation information and reservation ID. Preferably, contents may be recorded temporarily to the HDD to make sure that the contents are transferred unfailingly to the recorder 20.

What follows is an explanation of the structure of the recorder 20. The recorder 20 is constituted by a CPU 21, a RAM 22, a ROM 23, a network connection section 24, an input/output interface 25, a drive 26, an optical disk 27, a HDD 28, and a decoder 29.

The CPU 21 executes programs stored in the ROM 23 or programs loaded from the HDD 28 into the RAM 22, and controls the operations of the components connected to a bus.

The CPU 21 also controls the recording of contents to the HDD 28 or to the optical disk 27.

The network connection section 24 is a communication controller that communicates via a network with devices external to the recorder 20.

The input/output interface 25 is a module that processes the input operations performed by a user. Illustratively, the input/output interface 25 is furnished with control buttons/switches to be operated manually by the user, as well as a capability that accepts remote operations from a remote controller in the form of infrared rays (IR).

The drive 26 drives the attached optical disk 27 such as DVD or BD. Also, the drive 26 drives a memory card that may be inserted into a slot formed on the enclosure of the recorder 20.

The HDD 28 records the contents supplied over the bus. Under control of the CPU 21, the HDD 28 serves as an intermediumte buffer that stores contents before they are recorded to the optical disk 27.

In the above-described recording system, the receiver 10 and the recorder 20 interconnected via the network can offer capabilities to each other in accordance with suitable technical specifications such as UPnP (Universal Plug and Play).

UPnP is a set of specifications that presupposes the use of TCP (Transmission Control Protocol)/IP (Internet Protocol). Three protocols consisting of AutoIP, MULTICAST DNS, and SSDP (Simple Service Discover Protocol) form the basis of UPnP. As such, UPnP is a combination of IP technologies and XML constituting standard technologies of the Internet.

With regard to the content transfer under UPnP, the devices involved are grouped into two categories: medium servers for providing content data, and control points that function as control terminals. The medium server corresponds to what is generally called the server in a network system. In this embodiment of the invention, the receiver 10 works as the medium server.

The control points are each capable of controlling a UPnP-based device connected to the network. The control point capability may also be incorporated in the medium server. All or part of the devices constituting the network may each be furnished with the control point capability. In this example, the control point capability is assumed to be included in the receiver 10.

The control point capability is roughly classified into two functions: actions and queries. Actions are carried out in the manner specified by action information in a service description. Taking actions enables the control point to operate its target. Queries are used to acquire the values of device information in the service description. Actions or queries are implemented using the transport protocol called SOAP expressed in XML.

Also, the medium server incorporates the function called CDS (Contents Directory Service). CDS has two abstract objects: containers and items. They correspond illustratively to folders and files of Windows (registered trademark), an operating system offered by Microsoft Corporation.

Figure 3:
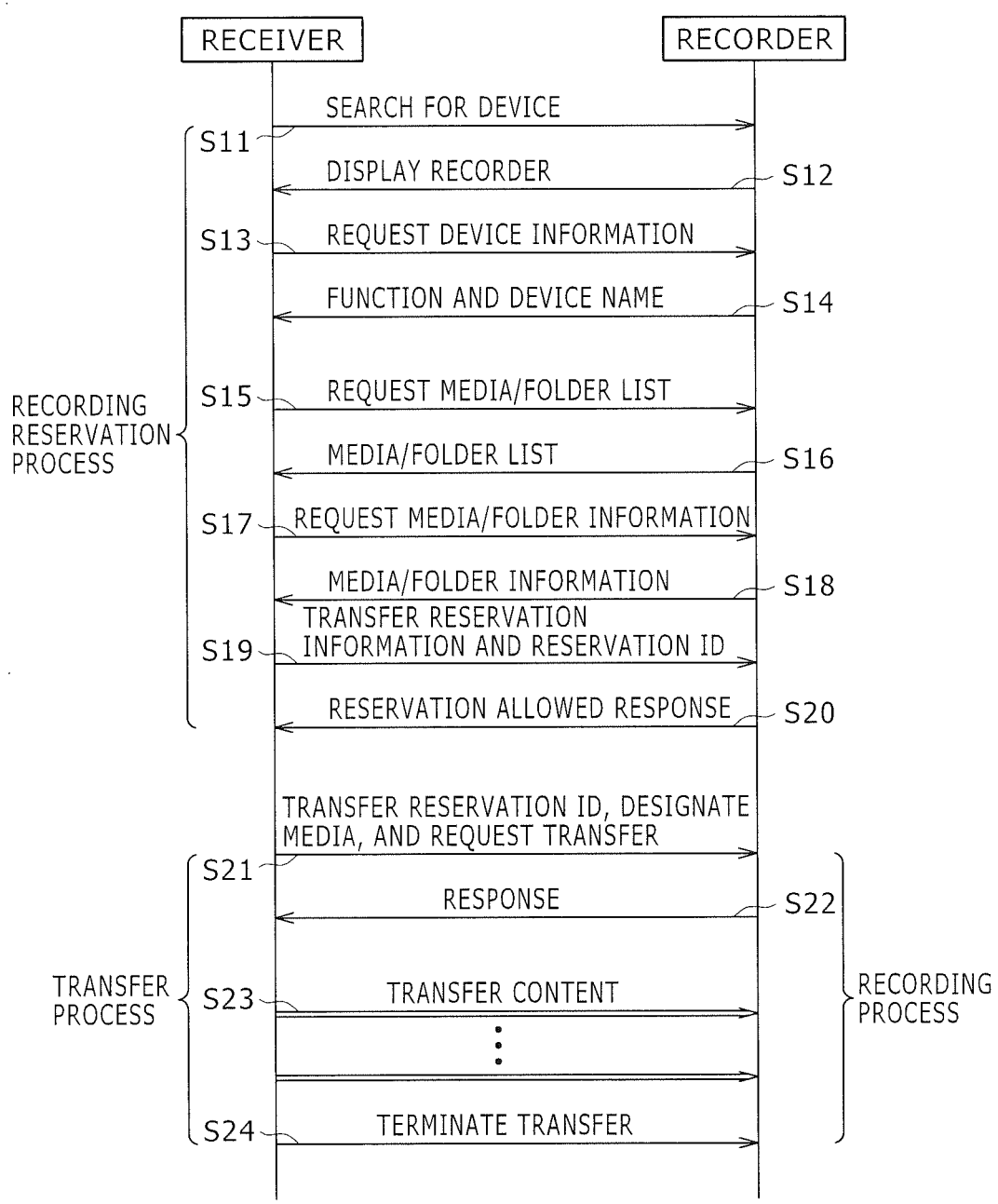
FIG. 3 is a schematic view showing a recording reservation process, a transfer process, and a recording process involving contents.
Figure 4:
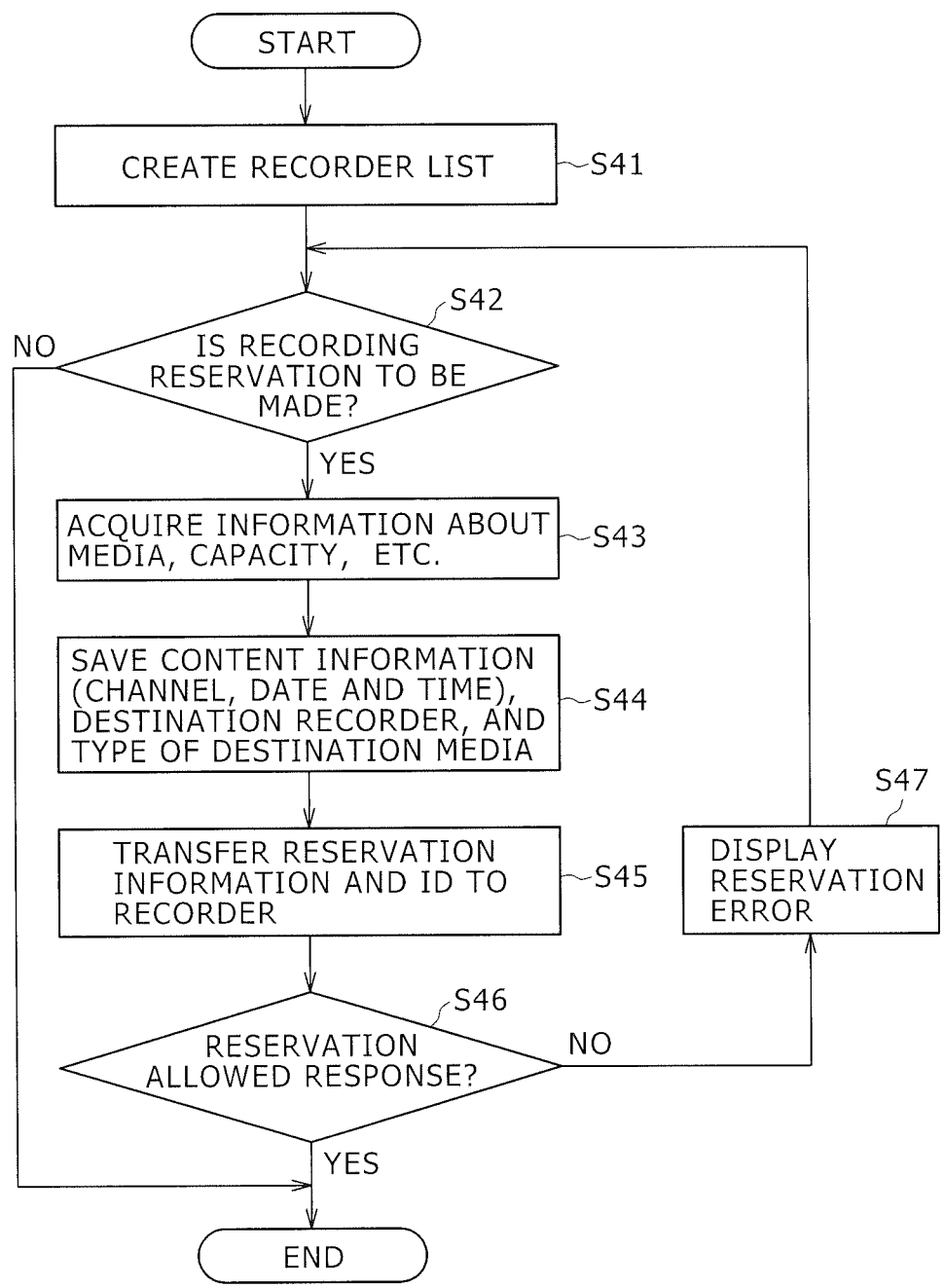
FIG. 4 is a flowchart of steps performed by the receiver executing recording reservation operations.

Described below in reference to FIGS. 3 and 4 is the recording reservation process. FIG. 3 schematically shows the recording reservation process, transfer process, and recording process involving contents. FIG. 4 is a flowchart of steps performed by the receiver 10 executing recording reservation operations. The recording reservation operations of the receiver 10 are controlled by the CPU 11 carrying out the programs stored in the ROM 13 or the programs loaded from the HDD into the RAM 12.

In step S41, the receiver 10 creates a recorder list. More specifically, upon power-on, the receiver 10 makes a request searching for devices that may be connected to the network ("M-Search request" in step S11 in FIG. 3). Given the request from the receiver 10, the recorder 20 sends back a response ("M-Search response" in step S12). The receiver 10 then queries the recorder 20 about device information called the device description ("Get Device Description" in step S13). In response to the query from the receiver 10 about the device information, the recorder 20 transmits a device description document in XML constituting the device information to the receiver 10 (in step S14). By acquiring the XML document, the receiver 10 can recognize a list of actions that can be effected on the recorder 20.

In step S42, the receiver 10 determines whether or not to set a recording reservation. If a recording reservation is to be set based on the input operations performed by the user, then step S43 is reached. If no recording reservation is to be made here, then the recording reservation process is brought to an end.

In step S43, the receiver 10 acquires device information about the medium, capacity, etc., of the recorder 20. More specifically, as shown in steps S15 through S18, the receiver 10 queries the recorder 20 about recording device information such as DestinationID, FriendlyName, etc., of the drive for writing purposes ("GetRecordDestinations"). In response, the recorder 20 transmits to the receiver 10 recording device information illustratively about HDD, BD, DVD, and memory card ("GetRecordDestinationList"). The receiver 10 also queries the recorder 20 about detail information illustratively as to whether the drive is available for writing and how much free space the drive offers ("GetRecordDestinationInfo"). In turn, the recorder 20 transmits detail information such as drive status to the receiver 10 ("RecordDestinationInfo"). For example, if the recorder 20 is capable of writing data to DVD+RW or DVD-R and if a DVD+RW disk is currently inserted, then the recorder 20 transmits the following detail information:

Recordable medium type: allowedTypes=BD, DVD+RW, DVD-R

Currently inserted recording medium: currentMediumType=DVD+RW

The transmitted detail information allows the receiver 10 to designate the type of medium as the destination for recording.

Also, the receiver 10 queries the recorder 20 about a container ID, logical content storage locations, etc., of the drive ("GetRecordContainerID"). In response, the recorder sends back the container ID, logical content storage locations, etc., of the drive to the receiver 10.

In step S44, the receiver 10 sets a recording reservation based on the input operations performed by the user. For example, on the basis of the device information acquired in step S43, the receiver 10 designates content information such as the channel and the date and time of the target content to be recorded, as well as recording destination information such as the recorder as the destination for recording and the type of medium to which to transfer the content. More specifically, the user initiates the recording reservation by use of the input/output interface 15, and selects the target content to be recorded illustratively by resorting to EPG information or by designating the channel and the date and time for recording. The user also selects such settings as high-quality recording and long-hour recording for each content to be recorded. With regard to these settings, the recorder and the type of medium may be fixedly determined beforehand.

The receiver 10 creates the above-described content information and recording destination information as reservation information, and creates a reservation ID of a unique value regarding each recording reservation. And the receiver 10 records the reservation information and reservation ID to the HDD.

In step S45, the receiver 10 transfers the reservation information and the reservation ID to the recorder (step S19). The recorder 20 records the reservation information and reservation ID to the HDD 28 and, based on the recording capacity and reservation status of the recorder 20, transmits a reservation-allowed response to the receiver 10 (step S20). If there is a previous reservation for the medium designated as the destination for recording or if, with the recorder 20 incapable of executing two recording processes in parallel, a reservation is found to have been made for another recording destination medium although no reservation exists for the medium targeted as the destination for recording, then the recorder 20 sends back a reservation-denied response.

In step S46, the receiver 10 determines whether a reservation-allowed response is received. If a reservation-denied response is found received, a reservation error is displayed in step S47, and step S42 is reached again. In this case, step S43 may be omitted. If the reservation-allowed response is acquired, the receiver 10 terminates the recording reservation process.

Figure 5:
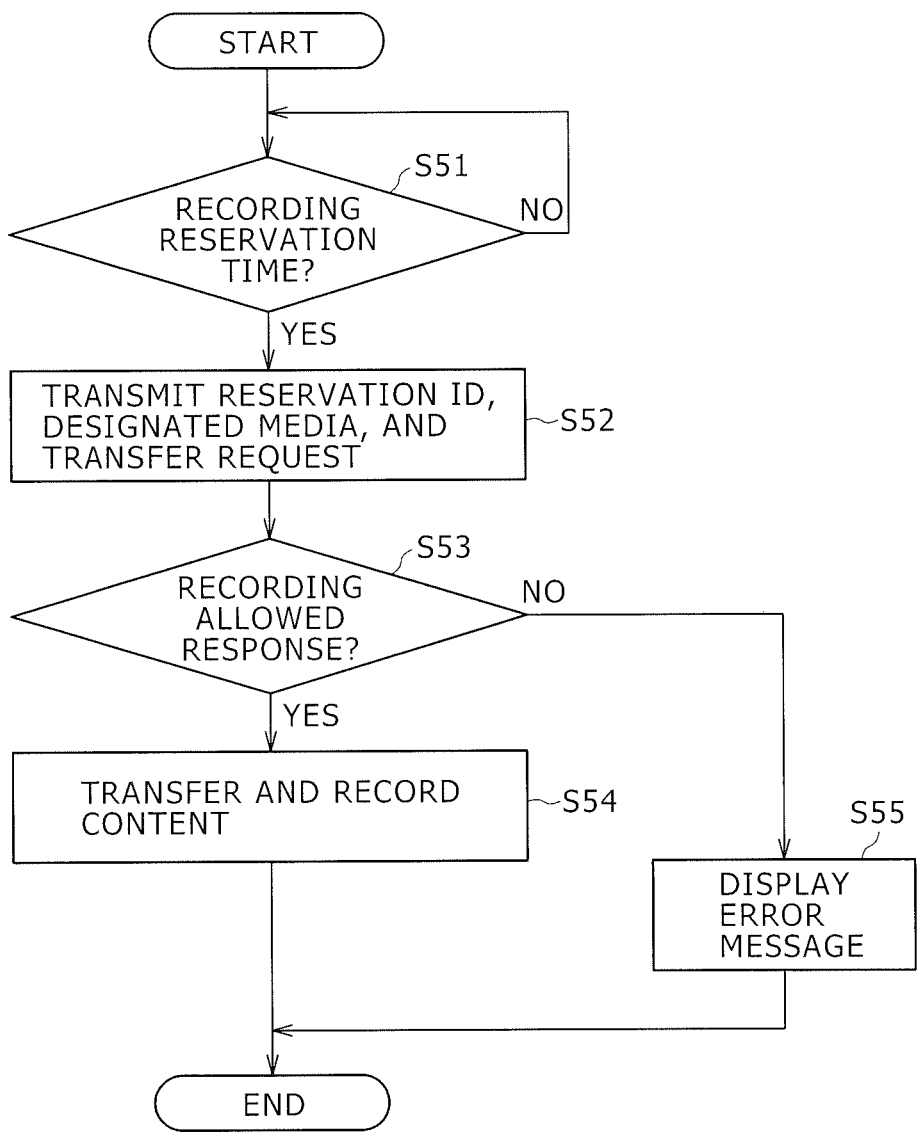
FIG. 5 is a flowchart of steps performed by the receiver executing transfer operations.
Figure 6:
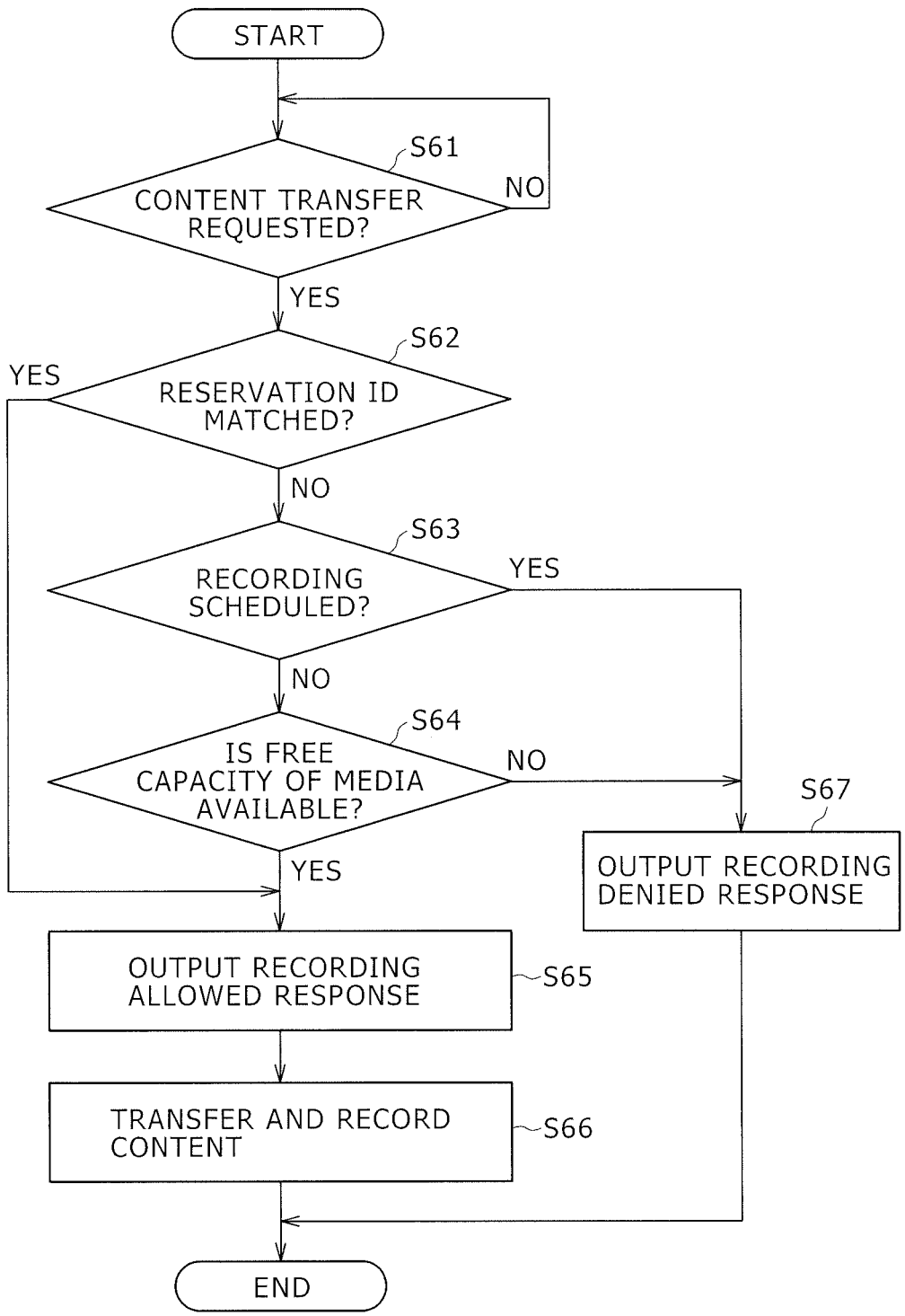
FIG. 6 is a flowchart of steps performed by the recorder executing recording operations.

Described below in reference to FIGS. 3, 5 and 6 is how the recording system operates on the basis of a recording reservation. FIG. 5 is a flowchart of steps performed by the receiver executing transfer operations, and FIG. 6 is a flowchart of steps performed by the recorder executing recording operations. The transfer operations of the receiver 10 are controlled by the CPU 11 carrying out the programs stored in the ROM 13 or the programs loaded from the HDD into the RAM 12. The recording operations of the recorder 20 are controlled by the CPU 21 executing the programs stored in the ROM 23 or the programs loaded from the HDD 28 into the RAM 22.

In step S51, when the time designated at reservation time is reached, the receiver 10 starts itself up and gets ready for recording.

In step S52, the receiver 10 transmits a content transfer request message specifying the type of medium designated at reservation time as the destination for recording. More specifically, the receiver 10 transmits recording destination information written in XML to the recorder 20 (step S21). At this point, the reservation ID attached to the reservation information at the time of recording reservation is transmitted.

In step S53, the receiver 10 determines whether a recording-allowed response is returned from the recorder 20 to which the content transfer request message was transmitted. If the recording-allowed response is found received, step S54 is reached. If a recording-denied response is found received, then step S55 is reached. The recording process of the recorder 20 will be discussed later.

In step S54, the receiver 10 transfers the content to the recorder 20. That is, the receiver 10 in step S54 performs the process called "http-post" defined by UPnP, transferring the content data to the URL that was received along with the recording-allowed response (step S23). When transmission of the content of a given title is completed, the receiver 10 notifies the recorder 20 of the end of the content transmission ("StopPst" in step S24).

Meanwhile, the recorder 20 performs the recording process such as one shown in FIG. 6. When the time designated at reservation time is reached, the recorder 20 starts itself up.

In step S61, the recorder 20 waits for the reception of a content transfer request containing recording destination information written in XML. Upon response of the content transfer request, step S62 is reached.

In step S62, the recorder 20 searches the HDD 28 for reservation information that would match the reservation ID received earlier together with the content transfer request. If there is the reservation information corresponding to the reservation ID, i.e., if the reservation ID has a match, then step S65 is reached and the recorder 20 sends a recording-allowed response to the receiver 10. More specifically, the recorder 20 transmits to the receiver 10 the URL (Uniform Resource Locator) representing the storage area of the destination to which to record the content data ("CreateObject response" in step S22). If there is no reservation information corresponding to the reservation ID, i.e., if the reservation ID does not have a match, then step S63 is reached.

In step S63, the recorder 20 determines whether recording is scheduled to take place based on the reservation information from the HDD 28. For example, if the user presses the record button of the receiver 10 in a time zone in which recording is scheduled to take place based on a recording reservation, a transfer request is issued with no reservation ID attached. In this case, the recorder 20 determines that recording is scheduled to take place based on reservation information. Where recording is scheduled to take place, step S67 is reached and a recording-denied response is output to the receiver 10. Where no recording is scheduled to take place, step S64 is reached.

In step S64, the recorder 20 determines the free space of the medium at the recording destination designated by the content transfer request. For example, if the free space of the medium at the recording destination is found to have been exhausted, then step S67 is reached and the recorder 20 returns a message saying that the recording request with no reservation ID attached is denied because of the medium being full. That is, the recorder 20 accepts only the recording based on a reservation ID. If a free space is found available on the medium at the recording destination in step S64, then step S65 is reached.

In step S65, the recorder 20 outputs a recording-allowed response to the receiver 10. More specifically, the recorder 20 transmits to the receiver 10 the URL (Uniform Resource Locator) denoting the storage area of the recording destination to which to record the content data ("CreateObject response" in step S22).

In step S66, the recorder 20 receives the content data sent from the receiver 10 and records the received content data to the recording destination designated by the reservation information or by the content transfer request. Upon receipt of "StopPost" indicating the end of the content transfer from the receiver 10, the recorder 20 transmits a complete signal to the receiver 10.

As described, when a content transfer request with a matching reservation ID is accepted as based on a previously allowed reservation, the recorder 20 can reliably record the content reserved for recording. Where a content transfer request does not have a matching reservation ID, the request is accepted only if a free space is found available on the medium with no other recording scheduled to take place. Illustratively, if the user presses the record button in a time zone in which recording is scheduled to take place based on a recording reservation, the recorder 20 receives a content transfer request with no reservation ID attached. In this case, the user is given a warning when the receiver 10 is notified of the previously established recording reservation.

If the medium at the recording destination are full of recording reservations, then the recorder 20 may only accept attempts to record contents based on reservation IDs. The recorder 20 may return a request-denied message in response to every recording request with no reservation ID attached because the medium are already full of recording reservations.

That is, when a recording reservation is to be set, a reservation ID that can identify the recording reservation in question is agreed on beforehand between a source apparatus that transmits content data and a destination apparatus that receives the transmitted content data. When recording is actually started, the reservation ID is sent from the receiver 10 to the recorder 20 so that the priority of the recording will be established and an alarm indication for the user will be displayed as needed. When the type of medium to which to record content data is set for each recording reservation and the medium type information is kept in relation to the corresponding reservation ID, the type of medium can be suitably selected for the recording of each reservation.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow. For example, if the series of the steps or processes described above is to be executed by software, the programs constituting the software may be incorporated beforehand in the dedicated hardware of a suitable computer.

What is claimed is:

1. A recording system comprising:
a receiving apparatus; and
a recording apparatus;
wherein said receiving apparatus includes:
a creation section configured to create reservation information designating a reception date and time at which to receive content data and a destination to which to transfer the received content data, together with identification information identifying said reservation information, and
a reservation control section configured to transmit said reservation information and said identification information to said destination;
said recording apparatus includes:
a recording section configured to record said reservation information and said identification information, and
a recording control section configured to control recording of the content data based on said reservation information;
wherein upon arrival of the reception date and time designated by said reservation information, said reservation control section receives said content data and transfers the received content data, along with said identification information, to said destination designated by said reservation information, and
given said identification information transferred along with said content data, said recording control section reads said reservation information from said recording section so as to record said content data based on said reservation information.

2. The recording system according to claim 1, wherein said recording section is capable of recording said content data to a plurality of types of recording medium,
and said reservation control section creates the reservation information designating the recording medium.

3. The recording system according to claim 1, wherein said recording section is capable of recording said content data to a plurality of types of recording medium, and said reservation control section designates one of said plurality of types of recording medium when transferring said content data.

4. The recording system according to claim 1, wherein said recording section allows recording of other content data based on the reception date and time designated by said reservation information.

5. The recording system according to claim 1, wherein said recording control section allows recording of other content data based on a free space of the recording medium designated by said reservation information.

6. A receiving apparatus comprising:
a creation section configured to create reservation information designating a reception date and time at which to receive content data and a destination to which to transfer the received content data, together with identification information identifying said reservation information; and
a reservation control section configured to transmit said reservation information and said identification information to said destination;
wherein, upon arrival of the reception date and time designated by said reservation information, said reservation control section receives said content data and transfers the received content data, along with said identification information, to said destination designated by said reservation information.

7. A recording apparatus, comprising:
a recording section configured to record reservation information designating a reception date and time at which to receive content data and a destination to which to transfer the received content data, and identification information identifying said reservation information; and
a recording control section configured to control recording of the content data based on said reservation information;
wherein, given said identification information transferred along with said content data, said recording control section reads said reservation information from said recording section so as to record said content data based on said reservation information.

8. A recording control method, comprising:
allowing a receiving apparatus to create reservation information designating a reception date and time at which to receive content data and a destination to which to transfer the received content data together with identification information identifying said reservation information;
allowing said receiving apparatus to transfer said reservation information and said identification information to said destination;
allowing said destination to hold said reservation information and said identification information in a recording section;
wherein upon arrival of the reception date and time designated by said reservation information, allowing said receiving apparatus to receive said content data and to transfer the received content data, along with said identification information, to said destination designated by said reservation information, and
given said identification information transferred along with said content data, allowing said destination to read said reservation information from said recording section so as to record said content data based on said reservation information.

9. A processor encoded with a computer program for causing an information processing apparatus to carry out a procedure comprising:
allowing a receiving apparatus to create reservation information designating a reception date and time at which to receive content data and a destination to which to transfer the received content data, together with identification information identifying said reservation information;
allowing said receiving apparatus to transfer said reservation information and said identification information to said destination;
allowing said destination to hold said reservation information and said identification information in a recording section;
upon arrival of the reception date and time designated by said reservation information, allowing said receiving apparatus to receive said content data and to transfer the received content data, along with said identification information, to said destination designated by said reservation information; and
given said identification information transferred along with said content data, allowing said destination to read said reservation information from said recording section so as to record said content data based on said reservation information.

10. A receiving apparatus, comprising:
creation means for creating reservation information designating a reception date and time at which to receive content data and a destination to which to transfer the received content data together with identification information identifying said reservation information; and
reservation control means for transmitting said reservation information and said identification information to said destination;
wherein, upon arrival of the reception date and time designated by said reservation information, said reservation control means receives said content data and transfers the received content data, along with said identification information, to said destination designated by said reservation information.

11. A recording apparatus, comprising:
recording means for recording reservation information designating a reception date and time at which to receive content data and a destination to which to transfer the received content data, and identification information identifying said reservation information; and
recording control means for controlling recording of the content data based on said reservation information;
wherein, given said identification information transferred along with said content data, said recording control means reads said reservation information from said recording means so as to record said content data based on said reservation information.

\* \* \* \* \*